United States Patent
Green

(10) Patent No.: US 7,218,440 B2
(45) Date of Patent: May 15, 2007

(54) PHOTONIC BANDGAP FIBER FOR GENERATING NEAR-DIFFRACTION-LIMITED OPTICAL BEAM COMPRISING MULTIPLE COAXIAL WAVELENGTHS

(75) Inventor: Kenton A. Green, Cary, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 33 days.

(21) Appl. No.: 11/211,420

(22) Filed: Aug. 25, 2005

(65) Prior Publication Data

US 2007/0047066 A1 Mar. 1, 2007

(51) Int. Cl.
*G02F 1/35* (2006.01)
*G02F 2/02* (2006.01)
*G02B 6/02* (2006.01)
*G02B 6/032* (2006.01)

(52) U.S. Cl. ............... 359/327; 359/326; 385/123; 385/125

(58) Field of Classification Search ........ 359/326–332; 385/123, 125
See application file for complete search history.

(56) References Cited

U.S. PATENT DOCUMENTS

2006/0153254 A1* 7/2006 Franjic et al. ............... 372/30

OTHER PUBLICATIONS

Hu et al., Design of HIghly-Nonlinear Tellurite Fibers with Zero Dispersion Near 1550nm, Optical Communications Research Lab, (Not Dated) (2 pages).
Agrawal, Nonlinear Fiber Optics, Quantum Electronics—Principals and Applications, (Not Dated) pp. 218-221, 228-231.
Kumar et al., Tellurite Photonic Crystal Fiber, Optics Express, Oct. 6, 2003, pp. 2641-2645, vol. 11, No. 20.
Birks et al., Endlessly Single-Mode Photonic Crystal Fiber, Optics Letters, Jul. 1, 1997, pp. 961-963, vol. 22, No. 13.
Stegeman et al., Tellurite Glasses with Peak Absolute Raman Gain Coefficients . . . , Optics Letters, Jul. 1, 2003, pp. 1126-1128, vol. 28, No. 13.

* cited by examiner

*Primary Examiner*—Michelle Connelly-Cushwa
*Assistant Examiner*—Rhonda S. Peace

(57) ABSTRACT

A photonic bandgap assembly used in a laser device for generating a near-diffraction-limited optical beam that comprises simultaneous multiple wavelengths. The photonic bandgap fiber assembly has a plurality of serially connected segments each having a photonic crystal fiber each being designed to efficiently perform Raman conversion on a pump wavelength to a near-diffraction-limited output wavelength. A first segment of the assembly is connected to a pump laser, and the output wavelength generated by each segment is output to the following segment to serve as a pump beam of the photonic crystal fiber thereof. Therefore, the pump beam is converted in a plurality of output beams with different wavelengths. The output beams can then be selectively recombined and coupled out as a multiple-wavelength optical beam.

41 Claims, 5 Drawing Sheets

PHOTONIC BANDGAP FIBER FOR GENERATING NEAR-DIFFRACTION-LIMITED OPTICAL BEAM COMPRISING MULTIPLE COAXIAL WAVELENGTHS

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates in general to a photonic bandgap fiber, and more particularly, to a laser device operative to emit an optical beam comprising multiple wavelengths.

In conventional optical fiber, total internal reflection is responsible for the guiding of light therein. Based on the principle of total internal reflection (TIR), an optical fiber typically consists of a central core surrounded by a cladding layer whose index of refraction $n_2$ is slightly lower than that $n_1$ of the core. The optical fiber is characterized by a normalized frequency as a function of the radius of the core and the core-cladding index difference, which is itself a function of the wavelengths of the guided optical beam. The normalized frequency determines the number of modes supported by the fiber. The dependence on wavelength indicates that conventional filter can maintain single-mode propagation area over a limited wavelength range. The wavelength range is material dependent, and is typically between 10% and 50% of the central wavelengths. For example, if the central wavelength at which the fiber propagates only single mode is 3 micrometers, the range is typically between 0.3 and 1.5 micrometers, which indicates 2.85 to 3.15 micrometers on one extreme and 2.25 to 3.75 micrometers on the other. Beneath the low end of the wavelength range, propagation of multiple modes is supported. Above the high end of the wavelength range, no modes are supported without very high losses or very stringent restrictions on bending, vibration, and micro-discontinuities in the fiber.

In contrast to conventional fibers, photonic bandgap fibers do not depend on reflection from slight differences in index of refraction of material; but rather, they depend on reflection from "bandgaps" created by microstructures (holes) in the fiber. Such fibers are called "photonic bandgap fiber" (PBG). The wavelength dependence of the modal propagation in photonic bandgap fibers is based on different phenomena and equations than total internal reflection. This renders photonic bandgap fibers to allow "endlessly single-mode" propagation which theoretically supports single-mode propagation over an infinite wavelength range. Practical single-mode propagation is then limited to the transparency range of the photonic bandgap fiber material.

Among various optical non-linear characteristics, Raman scattering is an important nonlinear process that shifts the input optical wavelength to longer wavelength. Such process is called as Stokes shift. In a typical fiber Raman laser, a single-mode fiber is placed inside a Fabry-Perot cavity formed by partially reflecting mirrors. Also, a prism can be installed between the mirrors to allow tuning of the laser wavelength by dispersing spatially various Stokes wavelengths which can be selected by rotating the mirror at the output side of the single-mode fiber. The threshold of the fiber-Raman laser is as large as about 500 W when a short fiber length, for example, 1.9 m is used. To reduce the threshold of the fiber-Raman laser to about 1 W, a fiber as along as 10 m is required. In addition to the length requirement, although the output wavelength is tunable in a broad range, the fiber-Raman laser is only operative to output a single wavelength at one time.

Various approaches, for example, diode-pumped solid state lasers frequency-shifted by optical parametric oscillators, and semiconductor (optically- or electrically-pumped heterojunction and quantum well) lasers, have been made to realize a simultaneous multiple-wavelength output, but have various drawbacks such as limited wavelength range, fixed wavelength and large divergence angle instead of near-diffraction-limited, which is typically the convergence of a beam required in many system. The optical parametric oscillator laser includes an optically nonlinear crystal to convert a pumped laser wavelength into a signal wavelength and an idler wavelength. The output of the semiconductor diode layers is typically less monochromatic (wider spectral output range) than other types of lasers; however, because of the small aperture size, the output beam divergence angle is as much as 20°.

As discussed above, the conventional fiber lasers require relatively long fibers to lower the threshold, and the output is monochromatic rather than multiple wavelengths. The heterojunction and quantum well lasers, though output multiple wavelengths, have beam divergence as much as 20°. Therefore, to obtain a near-diffraction-limited optical beam of multiple simultaneous, coaxial wavelengths with a compact volume inexpensively, a new design of laser system is required.

BRIEF SUMMARY

A photonic bandgap fiber assembly is provided to be used in a laser system for generating an optical beam comprising multiple coaxial wavelengths simultaneously. The photonic bandgap fiber assembly includes a plurality of serially connected segments each comprising a photonic crystal fiber, also referred as photonic bandgap (PBG) or holey fiber. Each of the photonic crystal fiber segments is designed to efficiently convert a pump wavelength to a near-diffraction-limited output wavelength (Raman shift). A first segment of the assembly is connected to a pump laser, which then emits a pump beam incident on the photonic crystal fiber of the first segment. Upon propagating through the photonic crystal fiber of the first segment, the pump beam is converted into a first output beam, namely, a first Raman beam, with a down-shifted frequency, that is, longer wavelength. The first Raman beam is the coupled to the second segment and incident on the photonic crystal fiber thereof as a pump beam. The first Raman beam is thus further frequency down-shifted into a second Raman beam to be coupled to the third segment of the series. The cascading frequency downshift is continued throughout the whole series; and consequently, multiple wavelengths can be obtained and recombined and output simultaneously.

When the pump laser is selected from a continuous wave source laser, due to the relatively low power level, a pair of Bragg gratings is preferably installed at two ends of each photonic crystal fiber. The segments, having Bragg grating on either end, can also be nested inside one another rather than being arranged serially. A selected wavelength of at least a fraction of the pump beam incident on each photonic crystal fiber can be resonated therein, and the frequency conversion efficiency can be improved. When a pulsed pump laser is used to provide the pump laser to the input of the series of the segments, as the power of the pulsed pump laser is sufficiently high for single-pass frequency conversion within the photonic crystal fibers, the Bragg gratings are not required. In either case, each of the segment may include a coupler to couple the pump beam the photonic crystal fiber and a wavelength division multiplexer (WDM), from which the output beam, that is, the Raman beam can be coupled out and coupled to the following segment simultaneously. Preferably, the Raman beams generated by the photonic crystal fibers can be selectively output according to specific requirement.

A laser device is also provided to employ the photonic bandgap fiber assembly as described above. The laser device includes a pump laser source, a plurality of serially connected segments each having a photonic crystal fiber, and a system output coupler. The pump laser is operative to generate either a continuous pump beam or a pulsed pump beam. The pump beam is coupled to an input of the arrangement of segments in series or parallel nested, and the output of each segment is optically connected to both an output coupler or splitter and the following segment. Thereby, when the pump beam emitted from the pump laser source is propagating through the first segment of the series, at least a fraction of the pump beam is converted into a first Raman output beam with a shifted frequency (wavelength). The first output beam is then coupled to a system output coupler and the second segment through a wavelength division multiplexer or power splitter. The first output beam coupled to the second segment serves as the pump beam for the photonic crystal fiber of the second segment to generate a second Raman output beam which has a down-shifted frequency compared to the first Raman output beam. The frequency shift continues like a cascade until the output beam is generated from the last segment of the series. The output beams generated from the segments can be selectively recombined at the output from the system output coupler, such that an optical beam with coaxial and simultaneous wavelengths can be obtained.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
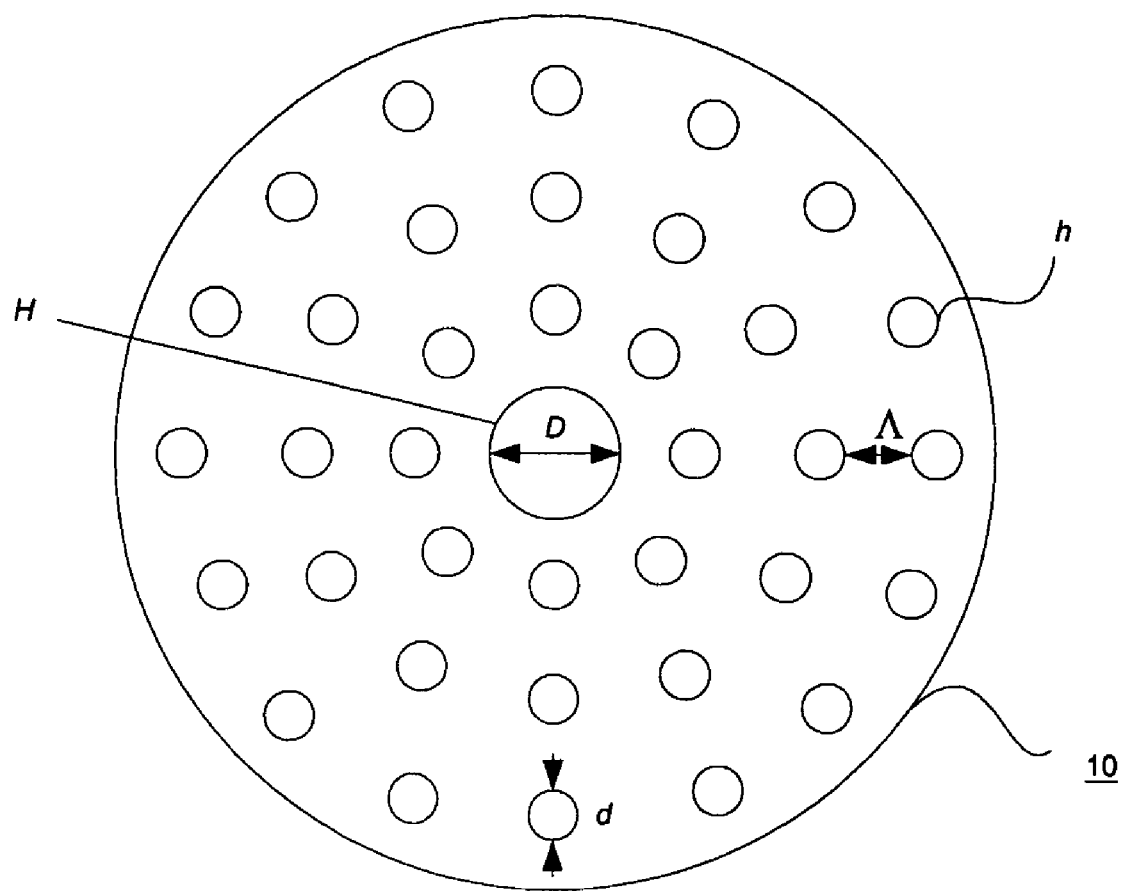
FIG. 1 illustrates a cross sectional view of a photonic bandgap fiber.

A photonic bandgap assembly is provided in a laser device to generate a near-diffraction-limited optical beam comprising simultaneous multiple wavelengths. A photonic bandgap is analogous to an electronic bandgap in semiconductors, which is a forbidden zone that neither electrons nor holes can occupy. A photonic crystal is a micro-structured material in which the variation of index of refraction is a function of position. The basic structure of a photonic crystal fiber includes a strand of a glass with channels filled with air or other gas, or evacuated extending through its length. The channels are also referred as holes because of their appearance when the fiber is viewed in cross sections as shown in FIG. 1. Depending on arrangement pattern of the channels, photonic-bandgap guiding and index guiding are available for confining light within the photonic crystal fiber. The photonic-bandgap guiding can be realized by surrounding the core of an optical fiber with a photonic-crystal structure, such that wavelengths falling within the bandgap of the photonic crystal cannot propagate out and are thus confined to the core. For example, a photonic bandgap guided photonic crystal fiber may comprise a hollow core surrounded by a close-packed triangular matrix of circular holes (channels). The advantages of the air-core fiber include high-power transmission without damage or introduction of non-linear effects, and no Fresnel reflections at the fiber ends. The index guiding is more analogous to the operation of a conventional step-index fiber. A typical index guided photonic crystal fiber has a solid core and a regular pattern of holes (air channels) surrounding the core. The holes effectively lower the refractive index of the cladding. Light is therefore guide by modified total internal reflection. In the embodiment as shown in FIG. 1, an endlessly single-mode photonic crystal fiber 10, a specific type of index-guided photonic crystal fiber which has been intensely researched, has a matrix of circular holes "h" with a missing hole "H" at the center. As shown, the central hole "H" has a diameter denoted as "D", and the diameter of the surrounding holes "h" is denoted as "d". The pitch or spacing between neighboring holes (including "H" and "h") is denoted as "Λ", which may vary according to specific requirement. Various materials can be used to fabricated this fiber, such as tellurite, chalcogenide, which may be doped with elements such as H and Ge, for example. In either guiding type, the core and cladding of the photonic crystal fiber can be made from the same materials, and can be doped with other elements to improve Raman conversion. Preferably, the endlessly single-mode photonic crystal fiber is incorporated and combined with the Raman fiber to provide a novel assembly.

Figure 2:
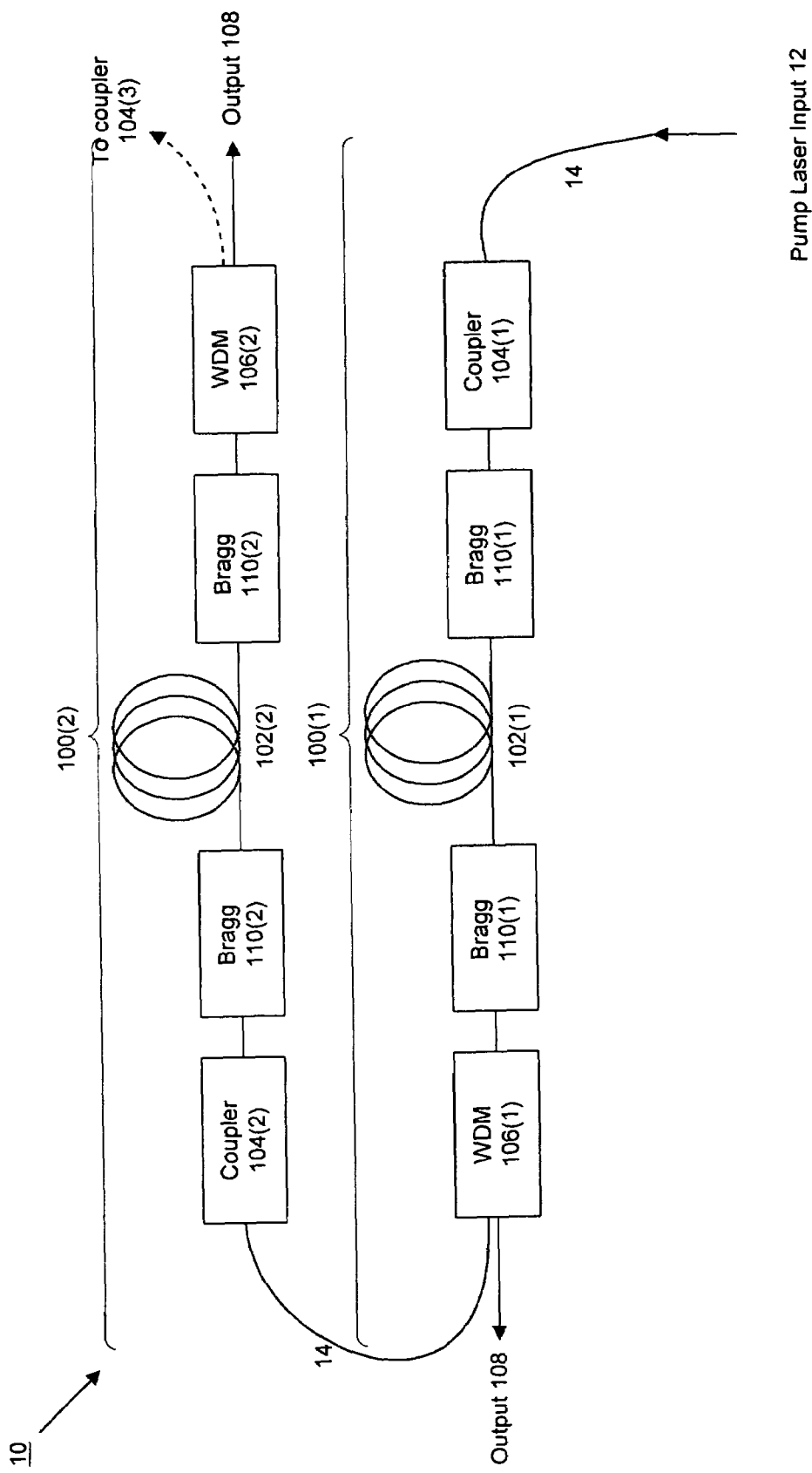
FIG. 2 illustrates a photonic bandgap fiber assembly suitable for use with a continuous wave pump laser source.
Figure 3:
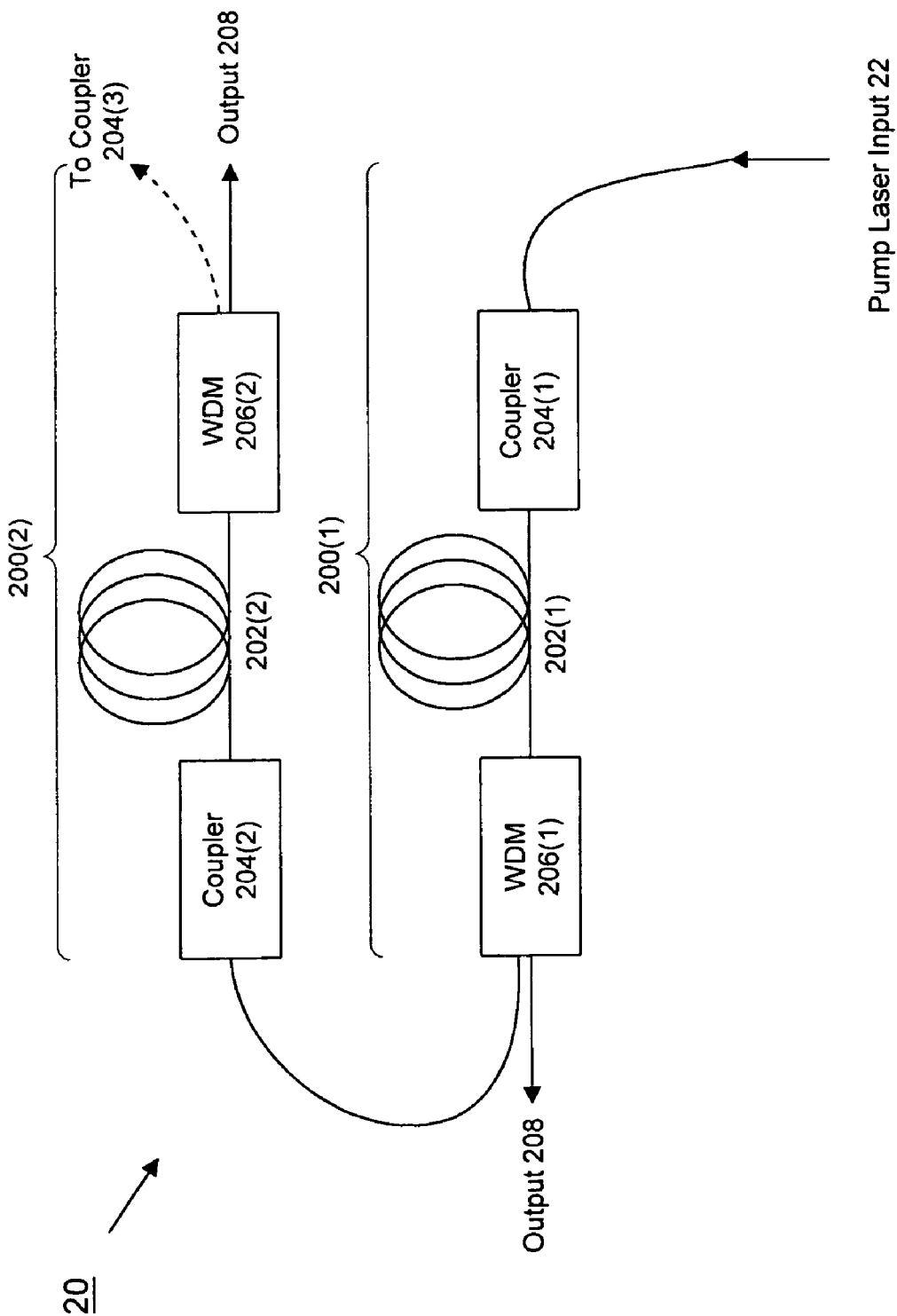
FIG. 3 illustrates a photonic bandgap fiber assembly suitable for use with a pulsed pump laser source.

FIGS. 2 and 3 show two exemplary photonic bandgap fiber assemblies each comprising a pump laser source 10, 20, a plurality of serially connected segments 100, 200, and a system output coupler 108, 208. In the embodiment as shown in FIG. 1, continuous wave laser is preferably selected as the pump laser source 12, while the pulsed laser is preferably selected as the pump laser source 22 for the photonic bandgap fiber assembly 20 as shown in FIG. 2. In both embodiments, the pump laser source (12 and 22) can be single or multiple spatial mode. Although the embodiments as shown in FIGS. 2 and 3 only include two segments 100, 200, it will be appreciated that the number of segments 100, 200 can be altered other than two according to the required output wavelengths, provided that the power supplied from the pump laser source 12, 22 and/or the wavelength conversion efficiency for each segment 100, 200 are sufficiently high.

As shown in FIG. 2, each of the segments 100 includes a photonic crystal fiber 102 to convert at least a fraction of incident power from an optical beam to another optical beam at a frequency downshifted by an amount determined by the vibrational modes of the fiber material. Such effect is known as the Raman effect and in this embodiment, the frequency-downshifted optical beam is referred as a Raman beam. The photonic crystal fiber 102 can be either photonic bandgap-guided and index-guided fiber. To obtain a near-diffraction-limited output beam, the arrangement of holes and material dopant concentrations and profiles in the photonic crystal fiber 102 are designed to (1) efficiently confine the incident beam and couple it in the core; (2) maintain a large nonlinear coefficient; and (3) simultaneously confines the output wavelengths in their respective single fundamental spatial modes in respective segments. Specific examples of the photonic crystal fibers 102 include chalcogenide (sulfide, selenide or telluride-based) glass photonic crystal fiber, and the pump laser source 12 includes a fusion-spliced single-spatial-mode continuous wave thulium-fiber laser, for example. The length of the photonic crystal fibers 102 is approximately 10 meters long, and the cladding holes are sized and arranged to confine the incident beam and the converted beam (Raman beam) to a single-spatial-mode solid core simultaneously.

As the power generated by the continuous wave pump laser source 12 is relatively low compared to the pulsed pump laser source, a pair of in-fiber Bragg gratings 110 is installed at two opposing ends of the photonic crystal fiber 102 for each segment 100 to improve the conversion efficiency. The installation of the Bragg gratings 110 establishes a cavity allowing selected wavelength of an incident beam to be resonated within the photonic crystal fiber 102 before being coupled out. As shown in FIG. 2, each of the segments 100 further includes a coupler 104 at the input side of the photonic crystal fiber 102 and a wavelength division multiplexer 106 at the output side of the photonic crystal fiber 102. The coupler 104(1) of the first segment 100(1) is connected to the pump laser source 12, while the coupler 104(2) of the second segment 100(2) is connected to the wavelength division multiplexer 108(1) of the first segment 100(1). Therefore, the pump beam emitted from the pump laser source 12 carried by various media such as air, conventional optical elements or a conventional optical fiber 14 is incident on the photonic crystal fiber 102(1) of the first segment 100(1), which then converts the pump beam into a first Raman beam with a downshifted frequency. Both the optical fiber 14 and the coupler 104 can be removed to allow the pump beam incident on the photonic crystal fiber 102 through free space. The wavelength division multiplexer 106 includes a dichroic beam, splitter or other devices operative to couple the first Raman beam to both the system output coupler 108 and to the following segment 100. The first Raman beam, upon propagating through the photonic crystal fiber 102(2), is converted into a second Raman beam of which the frequency is further down-shifted. The second Raman is then coupled to the system output coupler 108 via the wavelength division multiplexer 106(2) of the second segment 100(2). In this manner, an optical beam with two coaxial wavelengths, that is, the first Raman beam and the second Raman beam, can be obtained at the system output coupler 108.

As discussed above, the number of segments 100 can be increased according to the desired wavelengths. For example, the second Raman beam, while being output to the system output coupler 108 via the wavelength division multiplexer 106(2) of the second segment 100(2), can also be coupled to a third segment 100(3) which comprises a third photonic crystal fiber 102(3) to further downshift the frequency of the second Raman beam. In addition, according to specific requirement, the wavelength division multiplexer 106 of each segment 100 can also be adjusted to control the power level of the Raman beam coupled to the system output coupler 108. For example, when the photonic bandgap fiber assembly includes three segments 100 and only the first and third Raman beams are required, the wavelength division multiplexer 106(2) of the second segment 100(2) can be adjusted, or another element can be used at the output of the second segment 100(2), to prevent the second Raman beam from being coupled to the system output coupler 108. Alternatively, the wavelength division multiplexer 106 or other element can also be adjusted to allow only a fraction of the respective Raman beams to be coupled to the system output coupler 108, such that the intensity or power level of at least one individual wavelength of the multi-wavelength output beam generated by the assembly can be adjusted as desired.

When a pulsed pump laser is selected as the pump laser source 22 as shown in FIG. 3, each segment 200 includes a photonic crystal fiber 202, a coupler 204 and a wavelength division multiplexer 206. Example of the pulsed pump laser source includes a fiber-coupled multi-spatial-mode pulsed Nd:YAG diode-pumped solid state laser or other similar designs. As shown, the Bragg gratings used to resonate the selected wavelength of the pump beam are not required because the pulsed pump laser provides sufficient power level for single-pass frequency conversion. In this assembly, the selected wavelength, that is, the terminating Stokes order of the photonic crystal fiber 202 for each segment 100 is determined by the length of the photonic crystal fiber 202. In one embodiment, the length of the photonic crystal fiber 202 in each segment 200 is about 10 m, and examples of the photonic crystal fiber 202 include tellurite glass photonic fiber. Similar to the example as shown in FIG. 2, each of the segment 200 may include a coupler 204, which can be removed should free space transmission of the pump beam be selected, and a wavelength division multiplexer 204. The coupler 204(1) of the first segment 200(1) is connected to the pulsed pump source 22 by free space or various elements such as conventional optical device or optical fiber 14, such that the pump beam can be incident on the end of the photonic crystal fiber 202(1), which then converts the pump beam into a first Raman beam. The first Raman beam, upon being coupled to the system output coupler 208 via the wavelength division multiplexer 206(1), is also coupled to the second segment 200(2) as a pump beam incident on the photonic crystal fiber 202(2) thereof. The first Raman beam is then converted into a second Raman beam and coupled to the system output coupler 208. The multi-order Raman beams are then recombined at the system output coupler 208 and emitted simultaneously as an optical beam with coaxial multiple wavelengths. Again, one can selectively recombine the individual Raman beams generated by the respective segments at the system output coupler 208. The power level of each individual Raman beam can also be adjusted as desired in the similar manner as the assembly illustrated in FIG. 2. When more than two segments are included in the assembly, the Raman beam converted by each segment is coupled to the immediately following segment as a pump beam incident on the photonic crystal fiber thereof.

Figure 4:
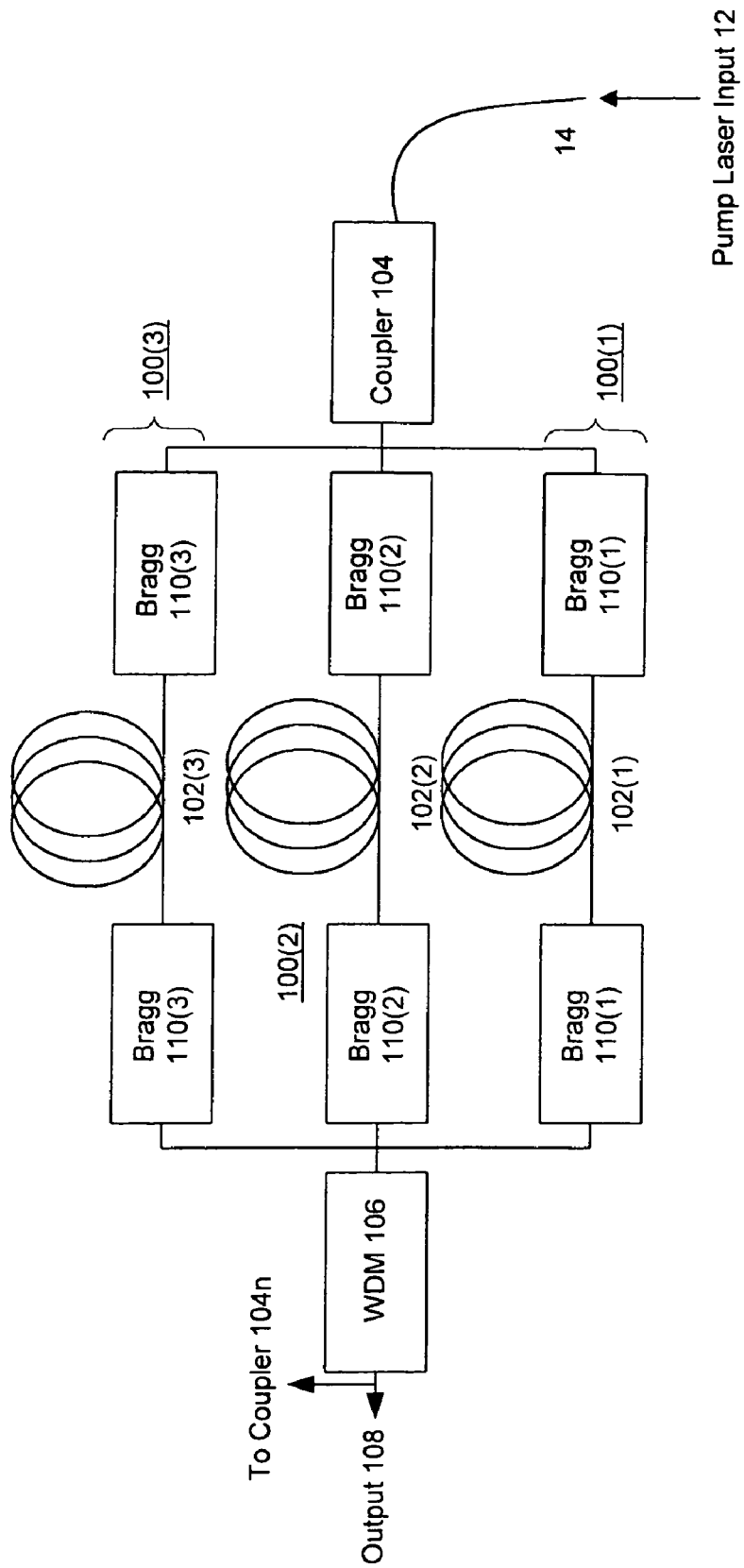
FIG. 4 shows an alternate arrangement of the segments of the photonic bandgap fiber assembly as shown in FIG. 1.
Figure 5:
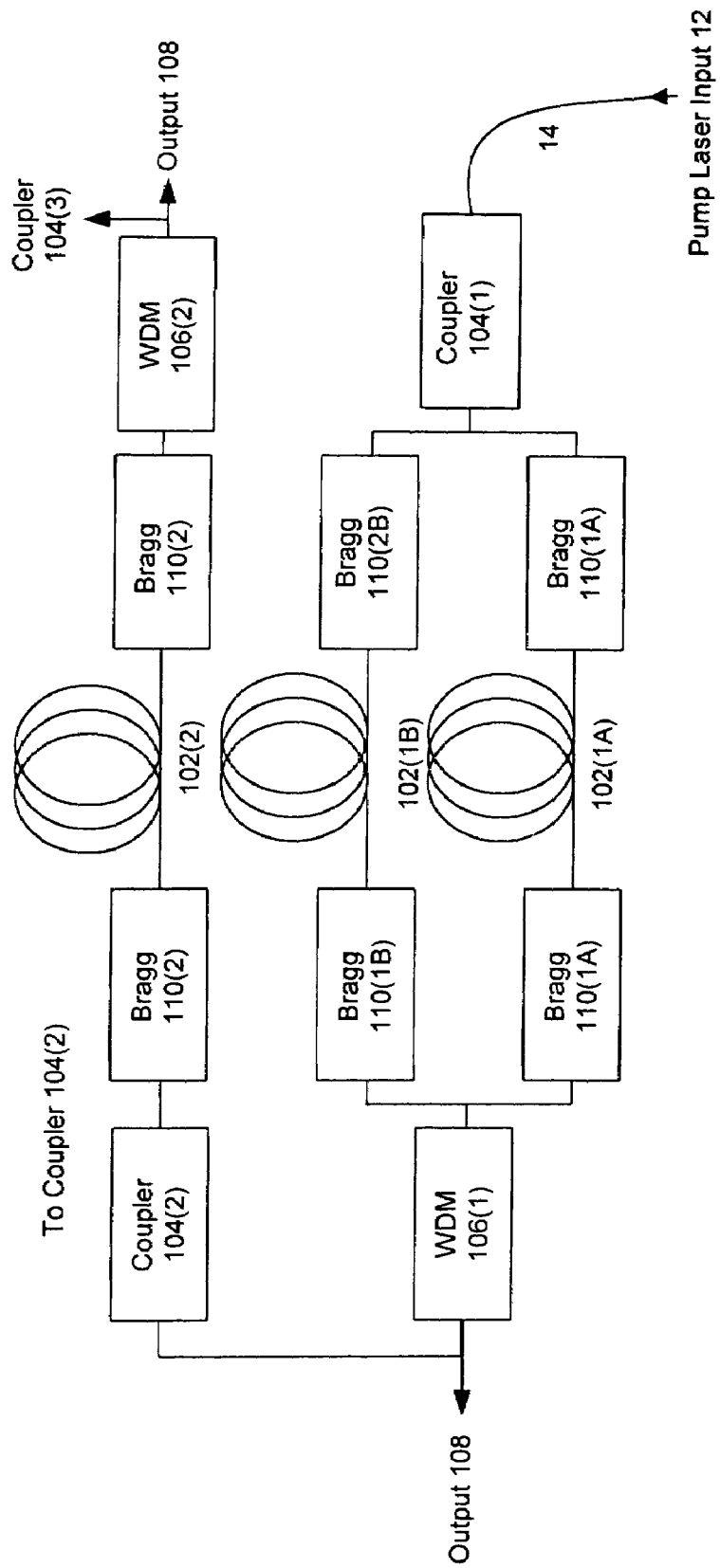
FIG. 5 shows an alternate arrangement of the segments of the photonic bandgap.

In addition to the serial connection between the segments as shown in FIG. 2, the photonic bandgap fiber assembly may also include a plurality of parallel nested segments as shown in FIG. 4. Or alternatively, at least one of the serially connected segments of the photonic bandbap fiber assembly may comprise a plurality of sub-segments connected in parallel with each other as shown in FIG. 5. Referring to FIG. 4, each of the segments 100(1), 100(2) and 100(3) connected in parallel comprises a photonic crystal fiber 102(1), 102(2) and 102(3). The segments 100(1), 100(2) and 100(3) are coupled to a common coupler 104, via which the pump beam generated by the pump beam source 12 is incident thereon. Similarly, in the example that a continuous-wave laser pump beam source is used, a pair of Bragg gratings 110(1,2,3) is installed at two opposing ends of each photonic crystal fibers 102(1,2,3). Thereby, the pump beam incident on each segment 100(1) to 100(3) is converted into a Raman beam with down-shifted frequency. Depending on the characteristic of each photonic crystal fibers 102(1) to 102(3), the wavelengths of the Raman beams generated from the segments 100(1) to 100(3) may be the same or different from each other. The Raman beams are then coupled out to the wavelength division multiplexer 108.

As shown in FIG. 5, the photonic bandgap fiber assembly includes a series of segments 100(1) and 100(2), and one of the segments 100(1) further includes a plurality of sub-segments 100(1A) and 100(1B) comprised of multiple photonic crystal fibers 102(1A) and 102(1B) connected in parallel with each other. When the photonic bandgap fiber assembly as shown in FIGS. 4 and 5 are applied with a pulsed laser pump source, the Bragg gratings 110 as shown in FIGS. 4 and 5 are removed. The photonic bandgap fiber assembly as shown in FIG. 5 can not only apply to a laser system individually or independently, but is also applicable to any segment of the assembly as shown in FIG. 2.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A photonic bandgap fiber assembly, comprising:
a plurality of serially connected segments, each of the segments comprising a photonic crystal fiber operative to convert at least a portion of an incident pump beam into an output beam with a shifted frequency, wherein each segment further comprising a pair of Bragg gratings installed at an input and an output of the photonic crystal fiber;
the photonic crystal fiber of a first segment is connected to a source pump beam; and
the output beam converted by each of the photonic crystal fibers is connected to photonic crystal fiber of the following segment as a pump beam thereof; and
an output coupler selectively recombining the output beams and outputting the selected output beams simultaneously.

2. The assembly of claim 1, wherein the source pump beam is emitted from a continuous wave laser.

3. The assembly of claim 2, wherein the source pump beam includes a pump beam emitted from a fusion-spliced single-spatial-mode continuous wave thulium-fiber laser.

4. The assembly of claim 2, wherein each photonic crystal fiber includes a plurality of holes so arranged to obtain a near-diffraction-limited Gaussian output beam that has a far-field angular fullwidth divergence approximately the same as the ratio of the wavelength to the waist diameter thereof.

5. The assembly of claim 1 wherein the reflectivity of the Bragg gratings is adjustable.

6. The assembly of claim 1, wherein the source pump beam is emitted from a pulsed pump laser source.

7. The assembly of claim 6, wherein the source pump beam is emitted from a fiber-coupled multi-spatial-mode pulsed Nd:YAG diode-pumped solid state laser.

8. The assembly of claim 6, wherein the length of each photonic crystal fiber is determined according to a desired wavelength of the respective output beam.

9. The assembly of claim 8, wherein the length of each photonic crystal fiber is about 10 meters.

10. The assembly of claim 1, wherein each of the segments further comprises a coupler for coupling the pump beam to the photonic crystal fiber thereof.

11. The assembly of claim 1, wherein each segment further comprises a wavelength division multiplexer for coupling the output beam output from the photonic crystal fiber thereof to the system output coupler and the following segment.

12. The assembly of claim 11, wherein the wavelength division multiplexers include dichroic beam splitters.

13. A laser system, comprising:
a pump laser source;
a plurality of serially connected segments having an input connected to the pump laser source, wherein each of the segments comprises a photonic crystal fiber to convert an incident pump beam into an output beam with a down-shifted frequency; and
a system output coupler operative to selectively recombine and output the output beams.

14. The laser system of claim 13, wherein the output beam output from each photonic crystal fiber is coupled to the photonic crystal fiber of the following segment to serve as a pump beam thereof.

15. The laser system of claim 13, wherein the pump laser source includes a continuous wave pump laser source.

16. The laser system of claim 15, wherein each segment further comprises a pair of Bragg gratings for establishing a resonant cavity within the photonic crystal fiber of the segment.

17. The laser system of claim 13, wherein the pump laser source includes a pulsed pump laser source.

18. The laser system of claim 17, wherein each photonic crystal fiber has a length determined by the desired wavelength of the output beam converted thereby.

19. The laser system of claim 18, wherein the length of each photonic crystal fiber is about 10 meters.

20. The laser system of claim 13, wherein each segment further comprises a coupler for coupling the pump beam to the photonic crystal fiber thereof.

21. The laser system of claim 13, wherein each segment further comprises a wavelength division multiplexer for coupling the output beam to the system output coupler and the following segment.

22. The laser system of claim 21, wherein the wavelength division multiplexers include dichroic beam splitters.

23. A photonic bandgap fiber assembly, comprising:
a plurality of segments each comprising at least one photonic crystal fiber operative to down shift frequency of at least a portion of an optical beam incident thereon; and
at least one output coupler for outputting the optical beam down-shifted frequency from at least one of the segments.

24. The photonic bandgap fiber assembly of claim 23, wherein the segments are connected to each other in parallel and coupled to an optical pump source.

25. The photonic bandgap fiber assembly of claim 24, wherein at least one of the segments further comprises a plurality of serially connected photonic crystal fibers.

26. The photonic bandgap fiber assembly of claim 25, wherein each of the photonic crystal fibers includes a pair of Bragg gratings at two opposite ends thereof.

27. The photonic bandgap fiber assembly of claim 24, wherein at least one of the segments further comprises a plurality of photonic crystal fibers connected in parallel.

28. The photonic bandgap fiber assembly of claim 27, wherein each of the photonic crystal fibers includes a pair of Bragg gratings at two opposite ends thereof.

29. The photonic bandgap fiber assembly of claim 23, wherein the segments are serially connected to each other and at least one of the segments comprises a plurality of photonic crystal fibers connected in parallel to each other.

30. A photonic band gap fiber assembly, comprising:
a plurality of serially connected segments, each of the segments comprising a photonic crystal fiber operative to convert at least a portion of an incident pump beam into an output beam with a shifted frequency, wherein each photonic crystal fiber includes a plurality of holes so arranged to obtain a near-diffraction-limited Gaussian output beam that has a far-field angular fullwidth divergence approximately the same as the ratio of the wavelength to the waist diameter thereof;
the photonic crystal fiber of a first segment is connected to a source pump beam; and
the output beam converted by each of the photonic crystal fibers is connected to photonic crystal fiber of the following segment as a pump beam thereof; and
an output coupler selectively recombining the output beams and outputting the selected output beams simultaneously.

31. The assembly of claim 30, wherein the source pump beam is emitted from a continuous wave laser.

32. The assembly of claim 31, wherein the source pump beam includes a pump beam emitted from a fusion-spliced single-spatial-mode continuous wave thulium-fiber laser.

33. The assembly of claim 31, wherein each segment further comprises a pair of Bragg gratings installed at an input and an output of the photonic crystal fiber.

34. The assembly of claim 30, wherein the reflectivity of the Bragg gratings is adjustable.

35. The assembly of claim 30, wherein the source pump beam is emitted from a pulsed pump laser source.

36. The assembly of claim 35, wherein the source pump beam is emitted from a fiber-coupled multi-spatial-mode pulsed Nd:YAG diode-pumped solid state laser.

37. The assembly of claim 35, wherein the length of each photonic crystal fiber is determined according to a desired wavelength of the respective output beam.

38. The assembly of claim 37, wherein the length of each photonic crystal fiber is about 10 meters.

39. The assembly of claim 30, wherein each of the segments further comprises a coupler for coupling the pump beam to the photonic crystal fiber thereof.

40. The assembly of claim 30, wherein each segment further comprises a wavelength division multiplexer for coupling the output beam output from the photonic crystal fiber thereof to the system output coupler and the following segment.

41. The assembly of claim 40, wherein the wavelength division multiplexers include dichroic beam splitters.

* * * * *